UNITED STATES PATENT OFFICE.

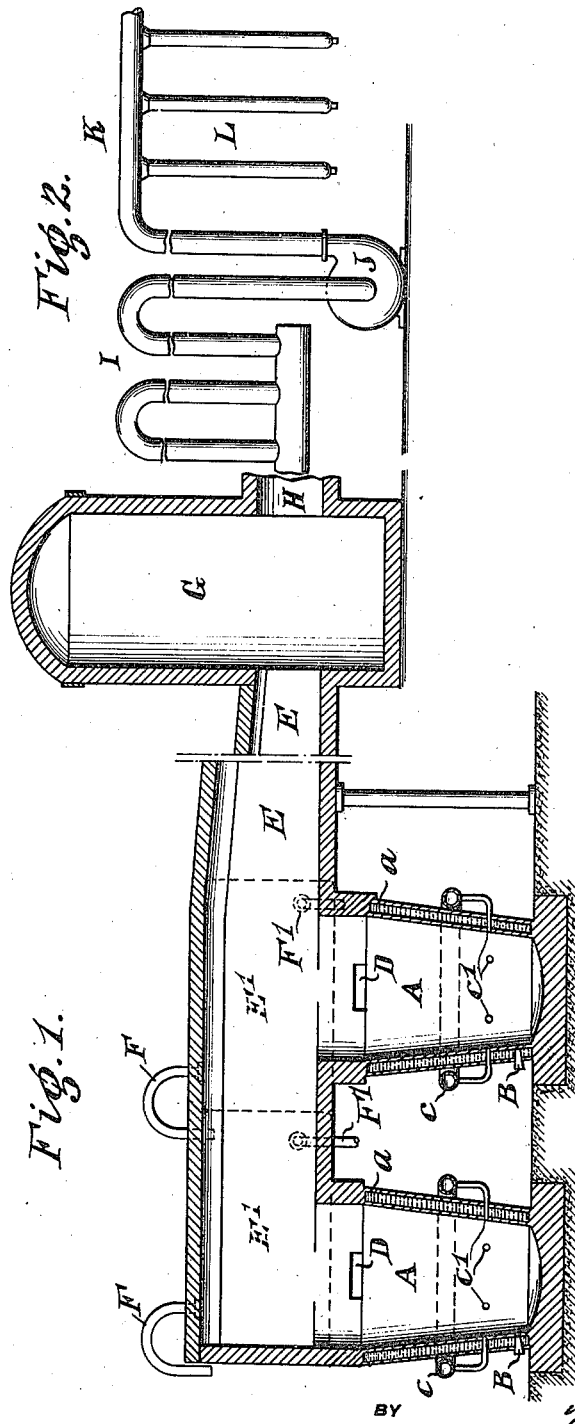

LOUIS S. HUGHES, OF JOPLIN, MISSOURI, ASSIGNOR TO PICHER LEAD COMPANY, OF JOPLIN, MISSOURI, A CORPORATION OF MISSOURI.

PROCESS OF MANUFACTURING SUBLIMED WHITE LEAD.

975,867.

Specification of Letters Patent.  Patented Nov. 15, 1910.

Application filed September 21, 1909. Serial No. 518,740.

*To all whom it may concern:*

Be it known that I, LOUIS S. HUGHES, a citizen of the United States of America, residing in Joplin, in the county of Jasper, in the State of Missouri, have invented a certin new and useful Improvement in Processes of Manufacturing Sublimed White Lead, of which the following is a true and exact description, reference being had to the accompanying drawings, which form a part thereof.

My invention relates to the manufacture of sublimed white lead, a well known pigment basis, consisting essentially of lead sulfate. This pigment has heretofore been, I believe, most successfully manufactured in furnace plants constructed in substantial accordance with the general structure and improvements described in the patents to Bartlett numbered 515,039 and 515,040, granted February 20th, 1894, and in the way described in said patents.

As heretofore practiced the process of manufacturing sublimed white lead as carried out in a plant such as that described by Bartlett was assumed to require a high temperature in the furnaces and flue system leading therefrom to the screen system, it being the understanding that such high temperature was necessary to the production of a pigment sufficiently white in color and of a texture best adapted for pigment use.

I have discovered that, contrary to the understanding and practice of those skilled in the art, the high temperatures heretofore used in the furnaces and flues do not either produce the best possible pigment or the largest pigment yield from the sulfid and other lead bearing materials used in the furnaces, and I have further discovered that by so regulating the blast and draft of the system as to maintain a temperature in the flues below that at which the free oxygen in the flue gases will combine with the $SO_2$ to form $SO_3$ in any large proportion an increased yield of improved pigment is secured, and my invention, broadly speaking, consists in treating lead sulfid ore and other lead bearing materials in low cupola blast furnaces to produce therefrom a high percentage of basic lead sulfate fume passing said fume in admixture with the furnace gases and air through heated flues maintained at temperatures below that at which any considerable formation of $SO_3$ occurs, and finally separating the metallic fume from the gases by screening.

I will describe my process more fully in connection with the drawing forming part of this specification and which illustrates in section a plant such as I have employed successfully in practicing my invention.

In this drawing, Figure 1 shows the furnaces and first part of the flue and Fig. 2 shows, on a reduced scale, the rear of the flue, the tower and the cooling and screening system.

A, A, are the low cupola furnaces inclosed by water jackets $a$, and having tap holes B.

C C, are blast pipes from which air passes into the furnace through twyers C'.

D, D, are charging apertures at the top of the furnace through which also enters the free air which passes with the furnace gases into the flue.

E, is the flue; E', E', water jackets forming the side walls of the flue above the furnaces, F, F, and F', F', are the pipes for feeding and withdrawing water to and from the jackets E'.

G, is the tower into which the flue E opens and in which the gases, etc., have a whirling or turning motion before passing into the flue extension H from which they pass to a cooling system indicated at I.

J is a suction fan through which the gases pass to the screen system indicated at K, L.

The character and general mode of use of the plant indicated in the drawing are well known.

As heretofore used a very hot and energetic combustion was maintained in the furnaces A, A, for the purpose and result of maintaining in the flue E and tower G a very high temperature. Accurate determination of the flue temperature was difficult in the old practice, and is still difficult, and temperature observations were and are in practice made by ascertaining the temperature in the tower G which was consistently maintained in the old practice above 1400° Fahrenheit, not infrequently approximating 1800° Fahrenheit, while the flue temperature in all cases materially exceeded 2000° Fahrenheit through the greater part of its length. At these temperatures the free $SO_2$ in the furnace gases combines freely with the free oxygen forming $SO_3$ which acts on the fume of basic lead sulfate $Pb_3S_2O_9$ or $2PbSO_4+PbO$, uniting with the PbO and converting it into the neutral sulfate $PbSO_4$ which is inferior to the basic sulfate for pigment uses.

By lowering the combustion in the furnace so that the measured temperature in tower G is maintained between 900° F. and 1400° F. and the flue temperature throughout the greater part of its length below 2000° F., I have discovered that I can secure a pigment consisting substantially of the basic sulfate and with complete elimination of carbonaceous impurities. In actual practice I have not found it practicable to avoid local superheating in the tops of the furnaces but by maintaining the flue temperature at the low heat stated the percentage of neutral sulfate formed is inconsiderable. Moreover in a process such as that carried out in the illustrated plant the amount of oxidation which can be accomplished on the finely divided sulfid ore thrown on the top of the furnace charge depends upon the amount of air which comes in contact with the ore unchanged and the uncombined air entering the furnace tops and flues will be greatly increased as the temperature of the furnaces, and consequently the temperature of the flue, is lowered, hence by lowering the temperature of the furnace I decrease the amount of products of combustion which the flue has to carry off and also reduce the proportionate volume of such products hence a larger volume of uncombined air can and does enter the furnace tops and flue and a larger proportion of the charge is converted into lead sulfate fume. This result is in great part due also to the decrease in the quantity of $CO_2$ which, though inert, is a diluent which interferes with the combustion of the ore. Again I have discovered that the heat heretofore used in the manufacture of sublimed lead has an injurious effect upon the tinctorial value of the pigment and that the basic lead sulfate produced by my process has distinctly greater tinctorial value. This is no doubt due to the fact that definite solid particles formed by condensation are larger in mass the more slowly they form and it is well known that tinctorial strength is in all cases proportionate to the fineness of the individual particles. My process involving the more rapid cooling and consequent more rapid precipitation of the pigment, will of course produce finer particles. Again I have discovered that the lead sulfate pigment can be made whiter in color by my process than by the old high heat treatment owing to the fact that the sublimate always contains some trace of ferric oxid. This ferric oxid is of low color strength unless superheated and in the old high heat treatment it was superheated to a degree which noticeably impaired the whiteness of the pigment while by my low heat treatment it is not given color strength enough to seriously darken the product. In addition to securing a larger proportion of sublimate from the charge used, a product not materially contaminated by neutral lead sulfate, a product of higher tinctorial value and of whiter color, I have found that my product is less variable than that of the old treatment because at my low temperature it is easier to maintain uniform conditions in the furnace and flue system and, of course, my treatment is materially less expensive in its consumption of fuel and less destructive to the furnace system.

Having now described my invention, what I claim as new and desire to secure by Letters Patent is,

In the process of manufacturing basic lead sulfate for use as a pigment which consists in maintaining one or more low cupola blast furnaces in operation, feeding lead sulfid ore and other lead bearing materials into said furnaces, passing the furnace gases and lead fume and burning sulfid in admixture with air through a heated flue system to complete the oxidation of the sulfid and eliminate carbon, and finally screening the furnace gases to separate the lead sulfate fume, the improved method of producing the sulfate pigment in greater proportionate quantity to the sulfid ore and other lead bearing materials used and of superior quality, which consists in maintaining the temperature of the flues at a point below that at which $SO_3$ will form in substantial and injurious quantity from the union of $SO_2$ and free oxygen in the flue.

LOUIS S. HUGHES.

Witnesses:
J. EDWARD WEBB,
RUBY SPARKS.